(12) United States Patent
Drezet et al.

(10) Patent No.: US 10,232,804 B2
(45) Date of Patent: Mar. 19, 2019

(54) ACOUSTIC PROTECTION COVER FOR ENCAPSULATING A MOTOR VEHICLE COMPONENT

(71) Applicant: CERA APS, Reims (FR)

(72) Inventors: David Drezet, Prosnes (FR); Michael Raybaud, Corbeny (FR); Stéphane Ribes, Romain (FR)

(73) Assignee: CERA APS, Reims (FR)

( * ) Notice: Subject to any disclaimer, the term of this patent is extended or adjusted under 35 U.S.C. 154(b) by 20 days.

(21) Appl. No.: 15/326,393

(22) PCT Filed: Jul. 16, 2015

(86) PCT No.: PCT/FR2015/051960
§ 371 (c)(1),
(2) Date: Jan. 13, 2017

(87) PCT Pub. No.: WO2016/009158
PCT Pub. Date: Jan. 21, 2016

(65) Prior Publication Data
US 2017/0197562 A1   Jul. 13, 2017

(30) Foreign Application Priority Data

Jul. 16, 2014   (FR) ...................................... 14 56834

(51) Int. Cl.
*B60R 13/08*   (2006.01)
*B32B 5/18*   (2006.01)
(Continued)

(52) U.S. Cl.
CPC .......... *B60R 13/08* (2013.01); *B29C 45/0081* (2013.01); *B29C 45/1676* (2013.01);
(Continued)

(58) Field of Classification Search
CPC . B60R 13/08; B60R 13/0846; B60R 13/0876; B60R 13/0884; B60R 2013/0807; B32B 2307/10; B32B 2307/102
See application file for complete search history.

(56) References Cited

U.S. PATENT DOCUMENTS

| | | | | | |
|---|---|---|---|---|---|
| 650,290 | A | * | 5/1900 | Wirt ........................ | F16F 9/306 181/207 |
| 2,756,172 | A | * | 7/1956 | Kidd ...................... | A44B 19/16 138/128 |

(Continued)

FOREIGN PATENT DOCUMENTS

| | | |
|---|---|---|
| DE | 202012010993 U1 | 11/2013 |
| EP | 2236358 A1 | 10/2010 |

(Continued)

OTHER PUBLICATIONS

International Search Report for International Application No. PCT/FR2015/051960, dated Dec. 1, 2015.

*Primary Examiner* — Edgardo San Martin
(74) *Attorney, Agent, or Firm* — Marshall, Gerstein & Borun LLP

(57) ABSTRACT

An acoustic protection cover for encapsulating a motor vehicle component, the cover including: a based on injection-molding material, the material comprising a thermoplastic matrix and a filler that is dispersed in such a way as to exhibit a density of between 1.3 and 1.6, the shell comprising two half-shells delimited by a thin region originating from the molding and forming a flexible hinge; a layer of elastically compressible foam overmolding the internal face of the shell, so that the cover forms an insulation system of the "mass-spring" type, the mass being formed by the shell and the spring by the layer; a means of holding the half-shells together once the hinge has been folded, so as to allow the component to be encapsulated, the (Continued)

Figure 1:
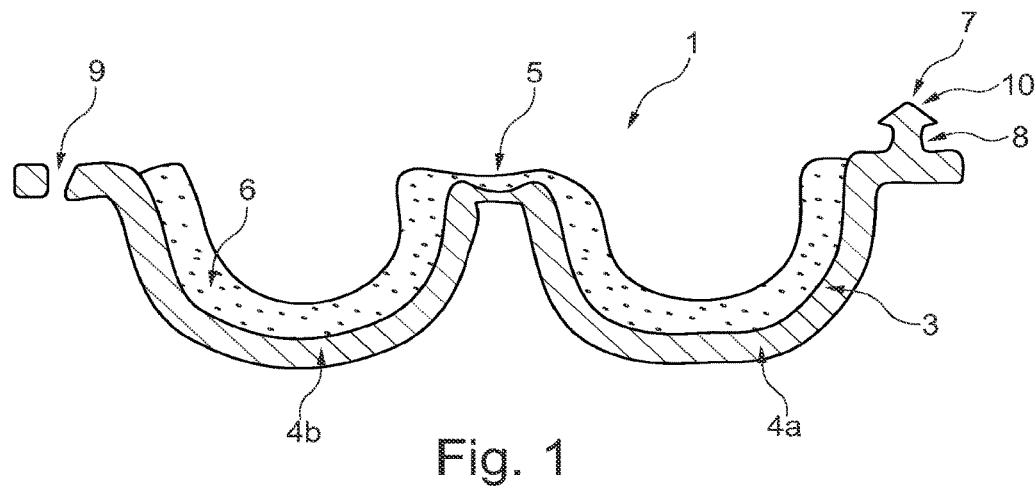

matrix being made of polyvinyl butyral (PVB) and the level of filling being less than or equal to 50% by mass of the material.

6 Claims, 1 Drawing Sheet

(51) Int. Cl.
 *B29C 45/16* (2006.01)
 *B29C 45/00* (2006.01)
 *B29L 31/00* (2006.01)
(52) U.S. Cl.
 CPC ............ *B32B 5/18* (2013.01); *B60R 13/0884* (2013.01); *B29C 2045/0056* (2013.01); *B29L 2031/768* (2013.01); *B32B 2266/0278* (2013.01); *B32B 2307/10* (2013.01)

(56) References Cited

U.S. PATENT DOCUMENTS

| | | | | |
|---|---|---|---|---|
| 3,233,699 | A * | 2/1966 | Plummer | F01N 13/14 138/141 |
| 3,244,388 | A * | 4/1966 | Coffman | F16L 3/14 138/107 |
| 3,424,270 | A * | 1/1969 | Hartman | C08L 7/00 181/290 |
| 3,652,360 | A * | 3/1972 | Hartman | C08L 7/00 156/244.11 |
| 4,026,381 | A * | 5/1977 | Conley | F01N 1/24 181/244 |
| 4,772,507 | A * | 9/1988 | Leo, Jr. | F16L 59/023 138/128 |
| 4,860,851 | A * | 8/1989 | Krevor | B29C 61/003 181/207 |
| 5,300,355 | A * | 4/1994 | Mifune | B32B 27/06 428/215 |
| H1317 | H * | 6/1994 | Ng | 181/207 |
| 5,647,563 | A * | 7/1997 | Gantner | F16L 33/035 24/20 EE |
| 6,126,119 | A * | 10/2000 | Giangrasso | F16L 55/035 248/58 |
| 6,177,173 | B1 * | 1/2001 | Nelson | B32B 7/02 428/137 |
| 6,601,802 | B1 * | 8/2003 | Howe | F16L 3/14 248/58 |
| 7,837,009 | B2 * | 11/2010 | Gross | B32B 27/12 181/208 |
| 8,142,879 | B2 * | 3/2012 | Whitaker | B29C 53/063 428/172 |
| 8,657,067 | B1 * | 2/2014 | Mathur | B32B 5/24 181/284 |
| 9,297,596 | B2 * | 3/2016 | Lehr | B32B 5/22 |
| 2007/0012509 | A1 | 1/2007 | Shimada et al. | |
| 2008/0006478 | A1 * | 1/2008 | Dreyer | F16L 55/0336 181/205 |
| 2008/0026246 | A1 * | 1/2008 | Saga | B32B 15/08 428/626 |
| 2008/0238118 | A1 * | 10/2008 | Halonen | B60R 13/0815 296/1.03 |
| 2010/0253004 | A1 | 10/2010 | Lehmann et al. | |
| 2015/0224750 | A1 * | 8/2015 | Visioli | B32B 27/08 428/95 |
| 2015/0260075 | A1 | 9/2015 | Schweiggart | |

FOREIGN PATENT DOCUMENTS

| | | | | |
|---|---|---|---|---|
| EP | | 2881287 A1 * | 6/2015 | ......... B60R 13/0838 |
| FR | | 3019784 B1 * | 5/2016 | ......... B60R 13/0838 |
| WO | WO-2008065049 A1 | | 6/2008 | |

* cited by examiner

ACOUSTIC PROTECTION COVER FOR ENCAPSULATING A MOTOR VEHICLE COMPONENT

CROSS-REFERENCE TO RELATED APPLICATIONS

The present application is the US national phase of International Patent Application No. PCT/FR2015/051960, filed Jul. 16, 2015, which application claims priority to French Application No. FR 1456834, filed Jul. 16, 2014. The priority application, FR 1456834, is hereby incorporated by reference.

FIELD OF THE DISCLOSURE

The invention relates to an acoustic protection cover for encapsulating a motor vehicle component, an architecture for mounting such a cover and a method for producing such a cover.

BACKGROUND

It is known to produce an acoustic protection cover for encapsulating a motor vehicle component, the cover including:

a shell based on injection-molded material, the material including a thermoplastic matrix and a filler that is dispersed in such a way as to exhibit a density of between 1.3 and 1.6 a/cm$^3$, the shell including two half-shells delimited by a thin region originating from the molding and forming a flexible hinge, a layer of foam—in particular polyurethane—elastically compressible overmolding the internal face of the shell, so that the cover forms an insulation system of the "mass-spring" type, the mass being formed by the shell and the spring by the layer, a manner of holding said half-shells together once the hinge has been folded, so as to allow said component to be encapsulated.

The components able to be encapsulated by such a cover are, for example, power steering or fuel injection pumps.

The thermoplastic matrix used is generally a polyolefin elastomer or a plastomer.

Because of this, its own density is rather low—about 0.85+−0.05—which requires the use of a high level of filling—generally about 60% by mass of the material of the shell—in order to reach the expected density.

The charge used is in particular mineral—being for example in the form of calcite or baryte—or metal.

With such a high level of filling, the extending of the material is very limited, which makes the hinge very brittle.

SUMMARY OF THE DISCLOSURE

The invention has for purpose to overcome this disadvantage.

To this effect, and according to a first aspect, the invention proposes an acoustic protection cover for encapsulating a motor vehicle component, said cover comprising:

a shell based on injection-molded material, the material comprising a thermoplastic matrix and a filler that is dispersed in such a way as to exhibit a density of between 1.3 and 1.6, the shell including two half-shells delimited by a thin region originating from the molding and forming a flexible hinge, a layer of elastically compressible foam overmolding the internal face of the shell, so that the cover forms an insulation system of the "mass-spring" type, the mass being formed by the shell and the spring by the layer, a means of holding the half-shells together once the hinge has been folded, so as to allow the component to be encapsulated, with the cover further having the following characteristics:

the matrix is made of polyvinyl butyral (PVB), the level of filling is less than or equal to 50% by mass of the material.

A conventional use of PVB consists of inserting it in the form of a film between two layers of glass, in particular in order to carry out the windscreens of motor vehicles or windows of buildings.

A characteristic of this material is its high degree of elasticity (about 240% of elongation to rupture) which makes it possible to retain broken glass and which prevents the layers of glass from shattering during an impact.

Furthermore, the PVB has a density of about 1.1, therefore substantially greater than that of the matrices used in prior art.

This results in that obtaining the same density requires less filler for a matrix made of PVB than for a matrix such as known in prior art.

The high elasticity of the PVB combined with the fact that the level of filling is reduced allows for the creation of a hinge that is particularly flexible and therefore not brittle.

According to other aspects, the invention proposes an architecture for mounting such a cover and a method for producing such a cover.

BRIEF DESCRIPTION OF THE SEVERAL VIEWS OF THE DISCLOSURE

Figure 2:
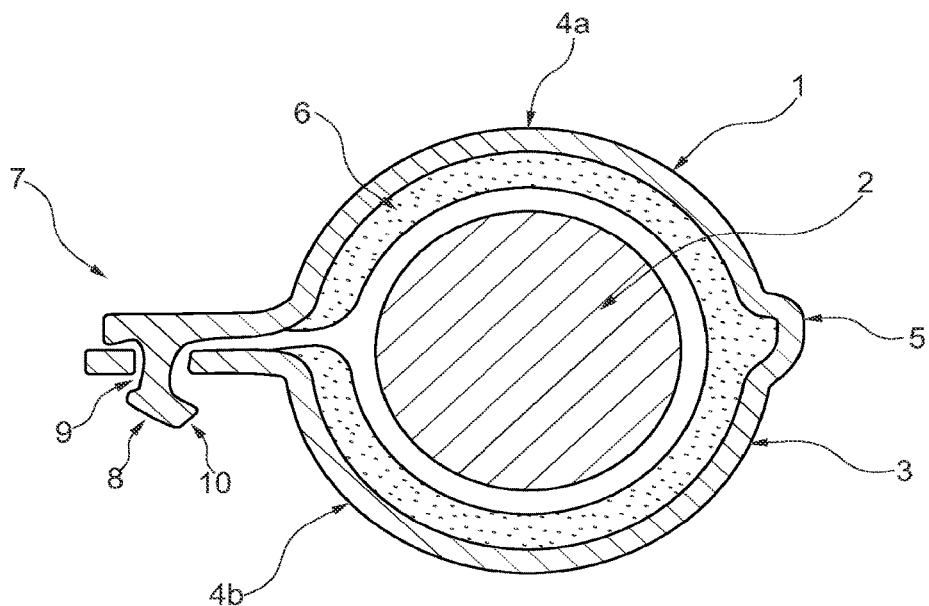

Other particularities and advantages of the invention shall appear in the following description, given in reference to the attached figures, wherein:

FIG. 1 is a cross-section diagrammatical view of a cover, with the hinge not folded, FIG. 2 is a cross-section diagrammatical view of the cover of FIG. 1 once mounted around a motor vehicle component, with the hinge folded and with the means of holding the half-shells activated.

DETAILED DESCRIPTION OF THE PREFERRED EMBODIMENTS

In reference to the figures, an acoustic protection cover 1 for encapsulating a motor vehicle component 2 is described, the cover comprising:

a shell 3 based on injection-molded material, the material comprising a thermoplastic matrix and a filler that is dispersed in such a way as to exhibit a density of between 1.3 and 1.6 a/cm$^3$, the shell including two half-shells 4a, 4b delimited by a thin region originating from the molding and forming a flexible hinge 5, a layer of elastically compressible foam 6 overmolding the internal face of said shell, so that said cover forms an insulation system of the "mass-spring" type, the mass being formed by the shell and the spring by said layer, a means 7 of holding the half-shells together once the hinge has been folded, so as to allow the component to be encapsulated, the cover further having the following characteristics:

the matrix is made of polyvinyl butyral (PVB), the level of filling is less than or equal to 50% by mass of the material.

According to an embodiment, the level of filling is between 42% and 46% by mass of the material of the shell 3.

According to the embodiment shown, the means of holding 7 includes a lug 8—here provided with a harpoon end 10—coming from material of the shell 3 and a slot 9, produced in the shell, for receiving the lug by nesting.

According to an embodiment, the filler is mineral—being for example in the form of calcite or baryte—or metal.

According to an embodiment, the compressible foam 6 is based on flexible polyurethane foam.

An architecture for mounting an acoustic protection cover 1 is now described, said architecture comprising said cover and a motor vehicle component 2 to be protected, said cover being mounted with the layer of foam 6 arranged in tight contact around said component, in particular against a casing that is part of said component.

Finally, a method for producing a cover 1 is described, the method including separating the polyvinyl butyral comprised in a laminated glass intended for recycling in order to produce the shell 3.

A major interest in deploying such a method is that the recycled PVB does not have sufficient quality to be reused in the manufacture of laminated glass; this here is therefore a recycling sector that is highly suitable for PVB.

Note that PVB, due to its very low melting point (about 110° C.) and of its amorphous nature—opposite the polyolefins used in prior art which are semi-crystalline—allows for a repeated folding of the hinge 5 at the output of the mold while the shell 3 is still hot, which allows for an orientation in molecular chains that makes said hinge even more robust.

The overmolding of the cover 1 by the layer of foam 6 is carried out by setting the shell 3 in place in a mold, with the hinge 5 not folded, and injecting a precursor mixture of elastically compressible foam onto the internal face of said shell.

What is claimed is:

1. An acoustic protection cover for encapsulating a motor vehicle component, said cover comprising:
    a shell based on injection-molded material, said material comprising a thermoplastic matrix and a filler that is dispersed in such a way as to exhibit a density of between 1.3 and 1.6 $g/cm^3$, said shell comprising two half-shells delimited by a thin region originating from the molding and forming a flexible hinge,
    a layer of elastically compressible foam overmolding the internal face of said shell, so that said cover forms an insulation system of the "mass-spring" type, the mass being formed by said shell and the spring by said layer,
    a means of holding said half-shells together once said hinge has been folded, so as to allow said component to be encapsulated, wherein:
    said matrix is made of polyvinyl butyral (PVB), and
    the level of filling is between 42% and 46% by mass of said material of the shell.

2. The cover according to claim 1, the means of holding including a lug coming from material of the shell and a slot, produced in said shell, for receiving said lug by nesting.

3. The cover according to claim 1, the filler being one of mineral or metal.

4. The cover according to claim 3, the compressible layer being based on flexible polyurethane foam.

5. The architecture for mounting an acoustic protection cover according to claim 1, said architecture comprising said cover and a motor vehicle component to be protected, said cover being mounted with the layer of foam arranged with tight contact around said component.

6. A method for producing a cover according to claim 1, said method comprising the step of separating the polyvinyl butyral comprised in a laminated glass intended for recycling in order to produce the shell.

* * * * *